(12) United States Patent
Zhang

(10) Patent No.: US 11,679,569 B2
(45) Date of Patent: Jun. 20, 2023

(54) REINFORCED ELEMENT FOR INDUSTRIAL TEXTILES

(71) Applicant: ASTENJOHNSON, INC., Charleston, SC (US)

(72) Inventor: Chi Zhang, Kanata (CA)

(73) Assignee: ASTENJOHNSON, INC., Charleston, SC (US)

( * ) Notice: Subject to any disclaimer, the term of this patent is extended or adjusted under 35 U.S.C. 154(b) by 1168 days.

(21) Appl. No.: 16/323,061

(22) PCT Filed: Aug. 3, 2017

(86) PCT No.: PCT/CA2017/050929
§ 371 (c)(1),
(2) Date: Feb. 4, 2019

(87) PCT Pub. No.: WO2018/023198
PCT Pub. Date: Feb. 8, 2018

(65) Prior Publication Data
US 2019/0184651 A1 Jun. 20, 2019

(30) Foreign Application Priority Data
Aug. 4, 2016 (CA) ..................................... 2938257

(51) Int. Cl.
*B29C 70/40* (2006.01)
*B29D 29/00* (2006.01)
(Continued)

(52) U.S. Cl.
CPC .............. *B29C 70/40* (2013.01); *B29D 29/00* (2013.01); *D21F 1/0054* (2013.01); *D21F 7/10* (2013.01);
(Continued)

(58) Field of Classification Search
CPC .............. C08K 5/0041; B29K 2067/00; B29K 2067/06; B29C 66/1616; B29C 66/1677;
(Continued)

(56) References Cited

U.S. PATENT DOCUMENTS

| 5,529,826 A | 6/1996 | Tailor et al. |
| 2003/0130381 A1* | 7/2003 | Joachimi ................. B29C 66/71 524/88 |

(Continued)

FOREIGN PATENT DOCUMENTS

| CA | 2778513 | 11/2013 |
| CA | 2778513 A1 | 11/2013 |

(Continued)

OTHER PUBLICATIONS

Office Action, CN 201780048938.2 dated Mar. 17, 2020.
(Continued)

*Primary Examiner* — Camie S Thompson
(74) *Attorney, Agent, or Firm* — Daniel J. Chalker; Edwin S. Flores; Chalker Flores, LLP

(57) ABSTRACT

A reinforced element for use in the construction and assembly of an industrial textile, the element comprising a fibrous reinforcing material encapsulated by a thermoplastic polymer matrix, wherein: the thermoplastic polymer matrix comprises an amorphous polyester, a low-crystallinity polyester, polyphenylene sulphide (PPS), or a mixture thereof; the fibrous reinforcing material comprises continuous filaments selected from the group consisting of thermoplastic polymeric filaments, thermosetting polymeric filaments, glass fibers and a mixture thereof such that a majority of the continuous filaments are oriented in a first direction and the remainder of the continuous filaments are oriented in a second direction that is generally perpendicular to the first direction; a temperature at which the amorphous polymer
(Continued)

substantially enters a liquid state, or the melting point of the low-crystallinity polyester, is at least 10° C. less than the melting point of the thermoplastic polymeric filaments; and the polymer matrix and the fibrous reinforcing material are both substantially transparent to radiant laser energy in a range of from about 800 nm to about 1200 run.

22 Claims, 8 Drawing Sheets

(51) Int. Cl.
  *D21F 1/00*  (2006.01)
  *D21F 7/10*  (2006.01)
  *C08J 5/24*  (2006.01)

(52) U.S. Cl.
  CPC ............ *C08J 5/246* (2021.05); *C08J 2367/03* (2013.01); *Y10T 428/24994* (2015.04)

(58) Field of Classification Search
  CPC ................. B29C 66/7212; B29C 70/00; Y10T 428/24994; C08J 2367/03; C08J 5/246; D21F 1/00; D21F 7/00
  USPC .......................... 428/297.4, 297.7; 156/272.8
  See application file for complete search history.

(56) References Cited

U.S. PATENT DOCUMENTS

2005/0123881 A1* 6/2005 Karmaker .............. A61C 13/30
                                  433/220
2014/0166224 A1  6/2014 Straub et al.

FOREIGN PATENT DOCUMENTS

| CN | 103958195 A | 7/2014 | |
| EP | 2949689 A1 | 12/2015 | |
| JP | 5338976 B2 * | 11/2013 | ................ F01L 1/08 |
| WO | 1996035833 | 11/1996 | |
| WO | 01/61105 A1 | 8/2001 | |
| WO | 2007001933 A1 | 1/2007 | |
| WO | 2103/071419 A1 | 5/2013 | |
| WO | 2018023198 A1 | 2/2018 | |

OTHER PUBLICATIONS

Extended European Search Report, EP 17836124.2 dated Feb. 3, 2020.
Canadian Intellectual Property Office, International Search Report and Written Opinion for PCT/CA2017/050929 dated Nov. 2, 2017, 12 pp.

* cited by examiner

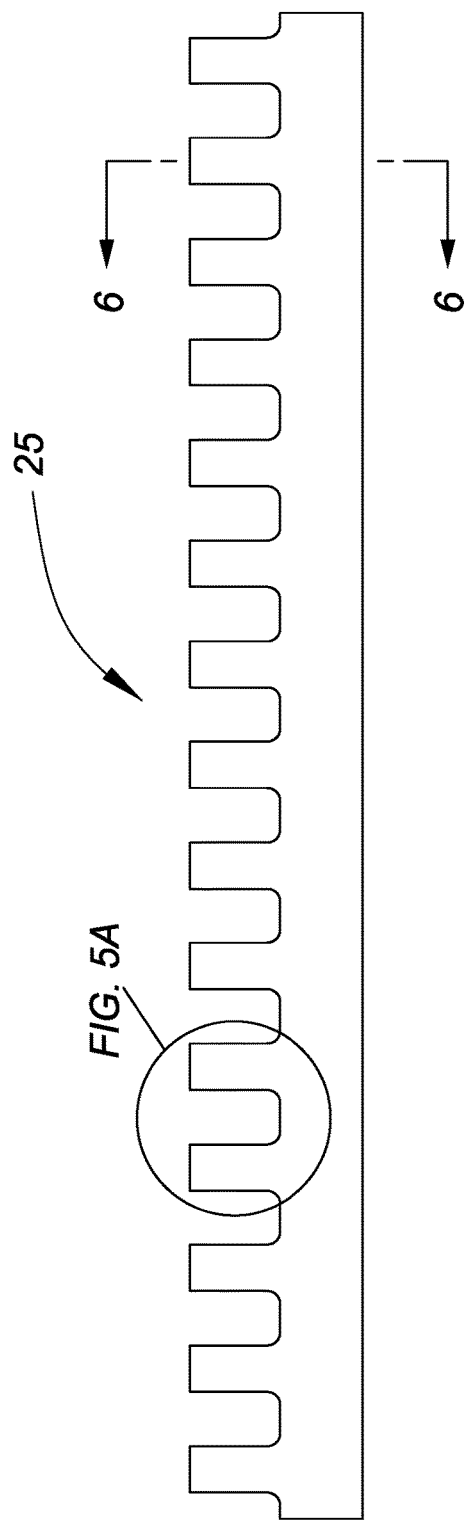
FIG. 5
FIG. 5A
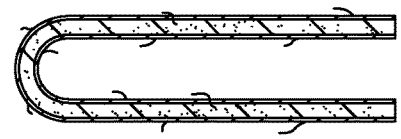
FIG. 6
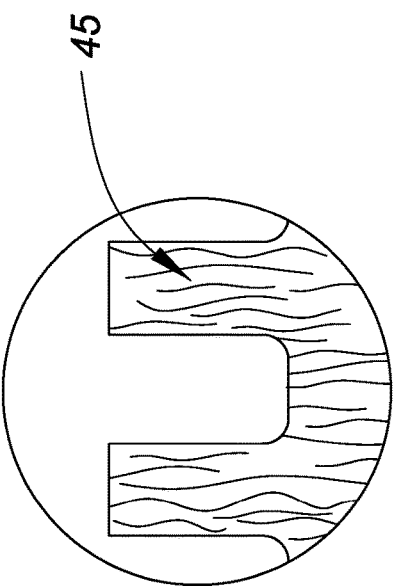

REINFORCED ELEMENT FOR INDUSTRIAL TEXTILES

CROSS-REFERENCE TO RELATED APPLICATIONS

This application is a U.S. National Stage Application of and claims priority to International Application No. PCT/CA2017/050929, filed on Aug. 3, 2017, which claims priority to Canadian Application No. 2,938,257, filed on Aug. 4, 2016. The contents of foregoing applications are hereby incorporated by reference in their entirety.

TECHNICAL FIELD

This disclosure relates to the field of industrial textiles. In particular, it relates to reinforced elements used to make industrial textiles intended for filtration and conveyance.

BACKGROUND

As used herein, the terms "fabric", "textile" and "industrial textile" are synonymous. Industrial textiles are belts of great length (as much as 100 m or more) and width (15 m or less) which are of woven or nonwoven construction. Such textiles are well known in papermaking applications where they are used to form, drain and convey a paper web through a papermaking machine.

Nonwoven industrial textiles can be made from smaller panels of slit and profiled polymeric film which can be assembled to provide a fabric having the desired finished dimensions. A seam can be subsequently installed at each of the opposing widthwise ends to allow these ends to be joined together so that the textile forms an endless belt. The seam construction should be such that it can be opened and closed to allow the textile to be removed or installed on the machine for which it is intended. The seam can be provided by welding seaming elements that are also made of polymeric film to the opposing ends of the textile and joining them together using a pin or pintle. In addition, such seaming elements can also be used in the construction of woven industrial textiles.

These panels and seaming elements—referred to collectively as "components" of industrial textiles, have been disclosed in U.S. Pat. No. 8,563,114, US 2012/0040150, WO 2014/121373, WO 2011/127594, WO 2013/023272, WO 2013/086609, WO 2013/181748, WO 2013/188964, WO 2014/053055, WO 2015/024107, WO 2015/081417 and WO 2015/081418 all of which are commonly assigned and incorporated herein by reference.

In particular, the aforementioned references disclose components that comprise at least a single layer of bi-axially oriented thermoplastic polymer film which is subsequently slit and shaped according to need. Where the number of polymeric film layers in a component is two or more, the layers may be compatible or dissimilar. Where the polymeric materials are dissimilar, a so-called "tie layer" may be located in between adjacent layers of dissimilar polymeric material, in order to prevent layer separation and to provide a unified film structure. In addition, each individual polymeric film layer must be stretched and oriented as it is produced so as to increase and maximize its elastic modulus, tensile strength and other physical properties. Such films are disclosed in commonly assigned WO 2013/071419 and WO 2013/177670 which are incorporated herein by reference.

In order to be suitable for use as a component for an industrial textile, such as a papermaking or similar process fabric, the film from which the component is formed often has a thickness of from about 100 µm to 500 µm, or from about 250 µm to 350 µm. This thickness is often uniform throughout. Components having such thickness, and which are manufactured in accordance with the above noted disclosures, have a maximum tensile strength of from about 350 to 525 N/cm or about 200 to 300 pli (pounds per linear inch), beyond which the component may rupture under load. However, the desirable tensile strength for such components should be at least 300 pli for papermaking applications. A material with higher tensile strength while retaining flexibility required for the component forming process would be highly desirable.

Since these components are made from at least one layer of polymeric film (as opposed to a plurality of yarns or fibers), each individual film layer should have adequate and uniform properties so that the resulting industrial textile is both rugged enough to withstand the rigors of certain industrial uses such as papermaking, filtration and conveyance applications, and homogenous in its various physical characteristics such as strength, planarity, permeability and so on. Unfortunately, the uniformity of many of these known film layers is often less than is desired. Such variation in properties can lead to premature failure of the component and thus the industrial textile while in use.

Fiber reinforced polymeric films and textiles so comprised are known. See for example U.S. Pat. No. 5,759,927 ((Meeker) which discloses applying a layer of glass fibers to a polymer web (film) and then either encapsulating them by heating and compressing them into the web, or superposing, heating and compressing a second layer of polymer film utilizing e.g. a belt press.

US 2005/0170720 (Christiansen et al.) describes a process for making a weather protection membrane in which a reinforcing woven or nonwoven fabric is located between two foils of polymer membrane and the resulting structure is laminated together with an edge treatment applied simultaneously to the opposing edges.

U.S. Pat. No. 4,740,409 (Lefkowitz) discloses a nonwoven papermaker's fabric comprising an array of essentially coplanar machine direction (MD) and cross-machine direction (CD) yarns encapsulated by a polymeric matrix containing vertically disposed fluid flow passageways; a surface layer comprised of porous fibers or foam is attached to the fabric by fusion bonding.

U.S. Pat. No. 4,541,895 (Albert) discloses a papermakers belt which is assembled from a plurality of nonwoven sheets (films) laminated together by e.g. ultrasonic welding; the sheets are rendered porous by laser drilling and MD reinforcing yarns are optionally located between the film layers during lamination.

US 2010/0230064 (Mourad et al.) discloses a nonwoven papermakers fabric formed by a spirally wound polymer strip; adjacent edges of the spiraled strip are laser welded to form the resulting fabric. U.S. Pat. No. 9,169,598 (Straub et al.) discloses a papermakers fabric formed from a plurality of film like web strips connected to one another at their side edges and whose ends are joined in offset relation to one another; when formed from a non-oriented polymer, the tensile strength of the film strips may be optionally reinforced by incorporating spirally wound yarns into the film.

U.S. Pat. No. 7,871,497 (Westerkamp) discloses a papermaking belt comprised of at least two layers of a polyurethane film between which there is included a reinforcement fabric; the mesh opening sizes are such that the two adjacent polyurethane layers can contact and be bonded together.

U.S. Pat. No. 5,609,936 (Kohler et al.) discloses a papermakers dryer fabric formed from at least one layer of a thread composite formed from mutually parallel thermoplastic filaments (preferably polyesters) which are bonded together is then bonded to a thin sheet, e.g. a slit reactive polyurethane sheet.

It would be desirable to enhance the physical properties of such components so that they can withstand a higher load, which ultimately results in more robust panels (for nonwoven industrial textiles) and more robust seaming elements.

It has now been found that it is possible to address these needs by forming the components from a reinforced film-like or sheet-like planar element.

SUMMARY

The reinforced element in its general form will first be described, and then its implementation in terms of embodiments will be detailed hereafter. These embodiments are intended to demonstrate the principles of the reinforced element, and the manner of implementation. The reinforced element in the broadest and more specific forms will then be further described, and defined, in each of the individual claims which conclude this specification.

In one aspect of the present invention, there is provided a reinforced element for use in the construction and assembly of an industrial textile, the element comprising a fibrous reinforcing material encapsulated by a thermoplastic polymer matrix, wherein: the thermoplastic polymer matrix comprises an amorphous polyester, a low-crystallinity polyester, polyphenylene sulphide (PPS), or a mixture thereof; the fibrous reinforcing material comprises continuous filaments selected from the group consisting of thermoplastic polymeric filaments, thermosetting polymeric filaments, glass fibers and a mixture thereof, such that a majority of the continuous filaments are oriented in a first direction and the remainder of the continuous filaments are oriented in a second direction that is generally perpendicular to the first direction; a temperature at which the amorphous polymer substantially enters a liquid state or the melting point of the low-crystallinity polyester is at least 10° C. less than the melting point of the continuous filaments; and the polymer matrix and the fibrous reinforcing material are both substantially transparent to radiant laser energy in the range of from about 800 nm to about 1200 nm.

In a further aspect of the present invention, there is provided a method for manufacturing the reinforced element described above, the method comprising applying heat and pressure to a planar woven precursor material, wherein: the woven precursor material comprises composite yarns; each yarn comprising a first set of continuous monofilament-like fibres comingled with a second set of continuous monofilament-like fibers; the first set of fibres forms the thermoplastic polymer matrix, and the second set of fibres forms the fibrous reinforcing material; and the planar woven precursor consists of an unbalanced weave pattern of the composite yarns.

In addition, the temperature at which the amorphous polymer is substantially brought into the liquid state, or the melting point of the low-crystallinity polyester can be at least 50° C. less than the melting point of the thermoplastic polymeric filaments.

The element may have a tensile strength of between 525 N/cm (300 lbs per inch) and 2000 N/cm (1140 lbs per inch), or for example, between 700 N/cm (400 lbs per inch) and 1750 N/cm (1000 lbs per inch). In addition, the element may have a tensile stress of between 200 MPa and 600 MPa, or for example, between 250 MPa and 500 mPa.

As an example, the thermoplastic polymer matrix can comprise PET (polyethylene terephthalate), PBT (polybutylene terephthalate) or PPS (polyphenylene sulphide). In addition, the amorphous or semi-crystalline polyester which form part of the thermoplastic polymer matrix, can be hydrolysis stabilized. For example, a polymeric or a monomeric carbodiimide may be used to hydrolysis stabilize the amorphous or semi-crystalline polyester.

The fibrous reinforcing material may comprise a glass fiber, a liquid crystal polymer (LCP), a high tenacity polyethylene naphthalate (HT-PEN) or PBO (poly[p-phenylene-2,6-benzobisoxazole]). In addition, the fibrous reinforcing material may comprise a uni-axially oriented semi-crystalline polymer.

Optionally, the reinforced element may also include an NIR laser energy absorbing material, such as (but not limited to) carbon black. The laser energy absorbing material can be provided in a layer having an overall thickness that is between 0.05:1 and 0.15:1 of the thickness of the reinforced element. Furthermore, when the laser energy absorbing material is carbon black, it may be provided in the layer in an amount from about 0.1% w/w to 1.0% w/w based on the total weight of the layer.

Overall, the element may have a thickness of from 100 μm to 500 μm, or, for example, from 250 μm to 350 μm.

In addition, the reinforced element may comprise a layer of the thermoplastic polymer matrix on one or both of exterior surfaces of the fiber reinforced element.

The reinforced element may be used, for example, as a textile panel or as a seaming element. The textile panel may be profiled and/or slit.

An industrial textile may comprise one or more of the reinforced elements described above. Such an industrial textile may be used as a papermaking fabric.

The method described above may include applying heat and pressure to a planar woven precursor material, wherein: the woven precursor material comprises composite yarns; each yarn comprising a first set of continuous monofilament-like fibres comingled with a second set of continuous monofilament-like fibers; the first set of fibres forms the thermoplastic polymer matrix, and the second set of fibres forms the fibrous reinforcing material; and the planar woven precursor consists of an unbalanced weave pattern of the composite yarns.

In addition, the planar woven precursor material can be passed through a double belt press. In order to impart a profile onto the reinforced element, the belts of the double belt press may be profiled.

The method of manufacture may further comprise addition of one or more layers onto one or both exterior planar surfaces of the element, wherein the one or more layers comprises a laser energy absorbent material that absorbs energy in the near-infrared (or "NIR", e.g. from 800 nm to 1200 nm) and mid-infrared (or "MIR", e.g. from 1500 nm to 2000 nm) range. The one or more layers may be a film layer laminated onto one or both exterior planar surfaces of the reinforced element, either during or after application of heat and pressure to the planar woven precursor. Alternatively, the one or more layers may be a matrix material provided in a woven fibrous form, that is either added during application of heat and pressure to the planar woven precursor; or is laminated onto one or both exterior planar surfaces after application of heat and pressure to the planar woven precursor.

In the method, it is also possible to add one or more layers of the thermoplastic polymer matrix onto one or both exterior planar surfaces of the reinforced element. This additional layer of the thermoplastic polymer matrix may either be in film form or woven fibrous form.

As used herein, the term "laser" refers to a device which provides NIR (Near Infrared) laser radiation of sufficient power to enable welding of polymer materials. As an example, NIR laser includes a wavelength range of 800 to 1200 nm, which will be suitable for use when an additional layer of weld enabling material is present. The laser may also be selected to provide light of longer wavelength, for example, from about 1500 to 2000 nm (which is the MIR range), to enable absorber-less welding. In such a case, a NIR laser energy absorbent additive would not be required at the exterior surface of the element to enabling welding of the various elements together, or to other thermoplastic components such as yarns or films.

The foregoing summarizes the principal features of the reinforced element and some optional aspects thereof. The reinforced element may be further understood by the description of the embodiments which follow.

Wherever ranges of values are referenced within this specification, sub-ranges therein are intended to be included within the scope of the reinforced element unless otherwise indicated. Where characteristics are attributed to one or another variant of the reinforced element unless otherwise indicated, such characteristics are intended to apply to all other variants where such characteristics are appropriate or compatible with such other variants.

BRIEF DESCRIPTION OF DRAWINGS

FIG. 4A illustrates a magnified view of a portion from FIG. 4.

FIG. 5 illustrates a top planar view of the seaming element shown in FIG. 4. FIG. 5A illustrates a magnified view of a portion from FIG. 5.

FIG. 6 illustrates a cross-sectional view of the seaming element shown in FIG. 5.

DETAILED DESCRIPTION OF PREFERRED EMBODIMENTS

Figure 1:
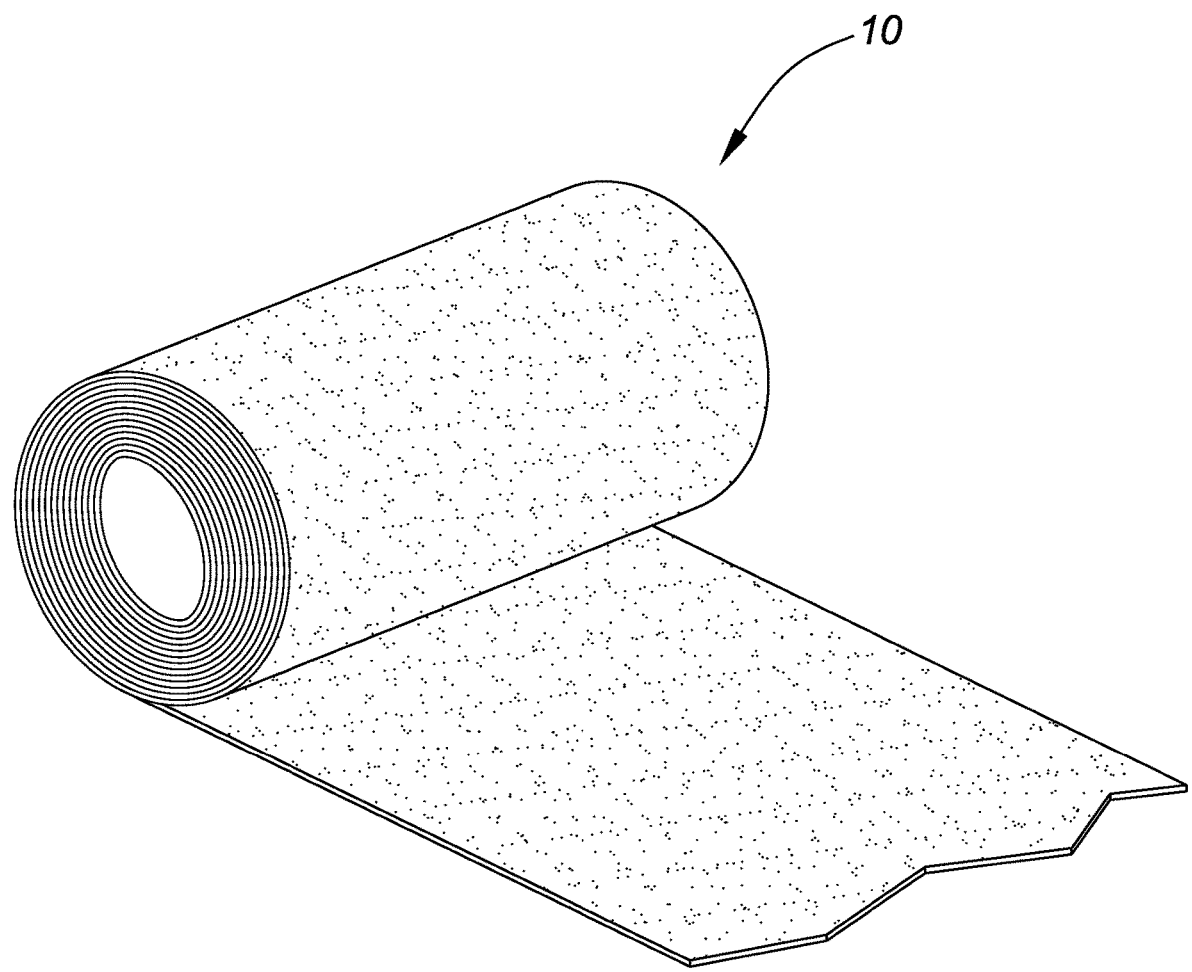
FIG. 1 illustrates an embodiment of the reinforced element.

The element comprises at least one layer of a fibrous reinforcing material that is wholly encapsulated within a thermoplastic matrix. In addition, the element may be optionally stabilized to resist hydrolytic degradation. The fibrous reinforcing material can be comprised of uni-axially oriented semi-crystalline thermoplastic filaments. The reinforcing material has tensile properties that allow the final composite to have desirable tensile strength, while the thermoplastic polymer matrix may be amorphous or of low-crystalline nature. In addition, the temperature at which the matrix material substantially enters the liquid state is lower than the melting point of the reinforcing material—for example, by 50° C. or more. The two materials are selected to provide good adhesion between matrix and reinforcing fiber after consolidation. The majority of the continuous thermoplastic polymeric filaments may be oriented in one of the MD or CD.

The element may have an overall thickness of from 100 μm to 500 μm, or, for example, from 250 μm to 350 μm. For example, when the element has a thickness of about 350 μm, it has an ultimate tensile strength of at least 700 N/cm (400 lbs per inch), and an ultimate tensile stress of at least 200 MPa. These strength and stress values may vary depending on the directionality of the majority and minority of the reinforcing fibers in the element. In addition, the element can be positioned such that the majority of the reinforcing fibers are directed in the length, or machine direction (MD) of the final product (e.g. industrial textile or seaming element), as this is the direction that will experience the highest tensile forces when in use.

The element may be substantially transparent to near-infrared (NIR) laser energy and optionally includes a thin layer of material that absorbs in the NIR and MIR range, on at least one exterior surface to enable the element to be welded to itself or another polymeric material such as yarns or panels using polymer laser welding equipment. Alternatively, the element may be laser welded without the use of NIR laser energy absorbing material. The element can also optionally include a thin layer of pure matrix material on one or both of the exterior surfaces for desirable surface properties. Components (e.g. industrial textiles, seaming elements, etc.) made from the element exhibit improved strength and uniformity in comparison to those of the prior art.

The thermoplastic polymer matrix can comprise a polyester, such as, for example, PET (polyethylene terephthalate), PBT (polybutylene terephthalate) or PPS (polyphenylene sulphide). Amorphous or low crystallinity polymers can be used for the element due to their toughness. Amorphous and low-crystallinity polymers also exhibit improved flow and wetting properties in comparison to those that are semi-crystalline, thereby allowing each of these to thoroughly encapsulate the second set of fibers in the manufacturing process. Optionally, the polyester of the thermoplastic polymer matrix may include a material that increases resistance to hydrolytic degradation. As an example, such a material can be a polymeric or monomeric carbodiimide.

The filaments of the fibrous reinforcing material can comprise, for example, a liquid crystal polymer, glass fibres or PBO (poly[p-phenylene-2,6-benzobisoxazole]).

Woven Precursor

The element is initially formed from a planar woven precursor material comprised of composite yarns. Each composite yarn is comprised of a plurality of first continuous monofilament-like fibers and a plurality of second continuous monofilament-like fibers. The first set of fibres eventually forms the encapsulating polymer matrix, while the second set of fibers are eventually encapsulated by the polymer matrix. The second set of fibers may be uni-axially oriented prior to their incorporation into the composite yarn. The composite yarns are formed by intimately blending together the first and second set of fibers in a prior comingling process.

The ratio, by weight, of the first set of fibers to the second fibers in the composite yarn may be about 50/50, but this ratio may be adjusted as required so as to obtain certain desired properties of the finished element.

The first set of fibers can be formed from a non-oriented amorphous polyester polymer or polyphenylene sulfide (PPS). Examples of amorphous polyester polymers from which the first set of fibers can be formed include: LPET (Low melt point, or low crystalline PET [polyethylene terephthalate]); PBT (polybutylene terephthalate; and PC (polycarbonate).

Depending on the intended end use, the amorphous polyester of the first set of fibers (that eventually form thermoplastic polymer matrix) may be stabilized to reduce susceptibility to hydrolytic degradation. Examples of stabilizers include carbodiimides. Stabaxol® (available from Rhein Chemie Rheinau GmbH of Mannheim, Germany) is an example. In addition, the polymeric version of this material may be used as it appears to reduce the brittleness of the final element, making the element less susceptible to fracture and failure, in comparison to similar elements in which the monomeric version of the stabilizer has been used.

The second set of fibers can be formed from either a uni-axially oriented semi-crystalline thermoplastic polymer, thermoset polymer, or glass. Examples of the second set of fibers include LCP (liquid crystal polymer), HT-PEN (high tenacity polyethylene naphthalate), PBO (poly[p-phenylene-2,6-benzobisoxazole]), and glass fibres.

The planar woven precursor material is provided by interweaving a plurality of the composite yarns according to an "unbalanced" weave pattern. The interweaving pattern is selected so that a majority of the composite yarns in the precursor are directed in a first direction, and a minority of the composite yarns are oriented in a second direction that is perpendicular to the first direction, while remaining within the plane of the precursor material. The majority of composite yarns oriented in the first direction can be between 51% and 90% of the composite yarns in the precursor, while the minority of yarns that are oriented in the second direction can be from 10% to 49% of the composite yarns in the precursor. As a further example, about 80% of the composite yarns can be oriented in the first direction, while about 20% of the composite yarns can be oriented in the second direction (which is perpendicular to the first direction). As an example, precursor woven material comprised of composite yarns produced by Comfil®, can be used.

Manufacture

The element is produced by exposing the planar woven precursor material (formed from the composite yarns) to specific settings of temperature and pressure for a defined period of time using, for example, a steel double belted heated press (such as disclosed in U.S. Pat. Nos. 5,141,583 or 4,826,560) or similar apparatus. Heat sufficient to bring to liquid state the amorphous polyester of the first set of fibers is applied though the steel belts of the press as the precursor material is exposed to a desired level of pressure. The heat and pressure are sufficient to bring into the liquid state, the amorphous polymer material of the first set of fibers and "wet", or fully encapsulate, the second set of fibers, while smoothing the exterior surfaces of the element. The thickness of the element is monitored and adjusted as necessary by adjusting parameters such as temperature, pressure, unwind tension and belt speed.

A double belt press allows for the continuous production of a sheet-like or film-like element in a single pass. The element (e.g. the planar woven precursor material, plus at least one layer of laser weld enabling film or matrix material), are guided together through the press while located between two continuous steel belts. The material passes through heating and cooling zones in the isobaric press; the residence time is selected so as to be sufficient to flow or melt the thermoplastic polymer of the first set of fibers thereby encapsulating the second set of fibers. The continuous belts may also be profiled to impart a surface pattern to the element from which the eventual component is formed by cutting and shaping as desired.

During this process, the filaments of the fibrous reinforcing material remain oriented according to the unbalanced weave pattern. The result is a reinforced planar element that includes reinforcing fibers (oriented according to the unbalanced weave pattern) that are located within a thermoplastic polymer matrix. The element may be arranged such that the majority of the reinforcing fibers are directed in the MD of the industrial textile.

In one method, a film layer (or layers) is formed that comprises an NIR laser energy absorbent material that is uniformly dispersed through the matrix polymer. An example of an NIR laser energy absorbent material includes particulate carbon black. The film layer (or layers) is laminated onto one or both exterior planar surfaces of the planar element using heat and pressure. This may be done during formation of the element (i.e. the film layer or layers are provided when the planar woven precursor is exposed to heat and pressure on the double belted press) so as to melt the film layer(s) and bond them to the exterior surface(s) of the element. Or the film layer (or layers) is laminated after the element is formed.

In another method, at least one additional layer of matrix material is provided in a woven fibrous form, (similar to the fibrous reinforcing material), and is joined with the thermoplastic polymer matrix and fibrous reinforcing material during formation of the element or is laminated after the element is formed. The polymer forming the continuous fibers of the additional layer of matrix material includes NIR laser energy absorbent material. Examples of NIR laser energy absorbent material include fine particulate carbon black, Clearweld™ (available from Crysta-Lyn Chemical Company, of Binghamton, N.Y.) and Lumogen™ (available from BASF Corp.).

Similar to the manufacturing of the laser absorbing layer, a thin layer of pure matrix material can also be provided as a film layer or a woven fibrous form, and is laminated onto one or both of the exterior surfaces of the thermoplastic polymer matrix and fibrous reinforcing material.

The additional layer (or layers) is provided in an amount such that, in the element, the ratio of the thickness of each of the additional layer (or layers) to the overall thickness of the element is between 0.05:1 and 0.15:1. For example, the thickness of the additional layer (or layers) can be between 5 µm and 75 µm when the overall thickness of the element is from 100 µm to 500 µm. When carbon black is used as the radiant energy absorbent, it can be present in the additional layer (or layers) in an amount from about 0.1% w/w (parts by weight) to 1.0% w/w based on the total weight of the at least one additional layer.

Following assembly, the planar element may then be cut and shaped to provide the desired components for use in the construction of a nonwoven industrial textile.

By controlling the weave pattern of the woven precursor material and the consolidation conditions, it is possible to form industrial textile components with a desired thickness having uniform physical properties that are readily adjustable, by selection of either the encapsulating matrix forming polymer (i.e. the polymer forming the first set of fibers), the fibrous reinforcing material (i.e. the polymer used to form the second set of fibers. A benefit of the present element is the enhancement of the tensile strength of the element over that of polymeric film layers alone. The element is laser weldable so that it is capable of being bonded to other thermoplastics, such as another component or polymeric yarns or films using laser energy.

FIGS. 1-8 illustrate a number of the embodiments discussed above.

Figure 2:
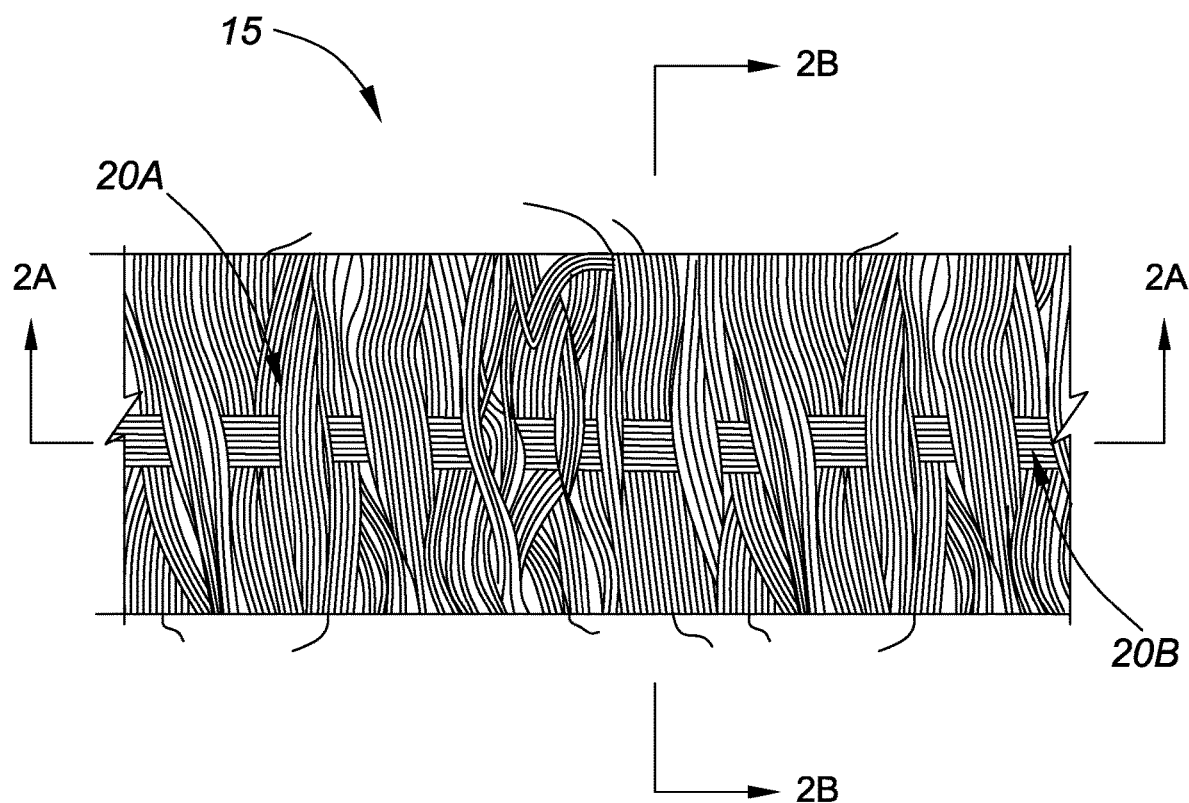
FIG. 2 illustrates a detailed, top planar view of the embodiment shown in FIG. 1.

For example, FIG. 1 illustrates a roll (10) of an embodiment of the reinforced element. FIG. 2 illustrates a detailed top planar view of a portion (15) the embodiment shown in FIG. 1, in which the majority of reinforcing fibers (20A) are generally in a vertical direction, while a minority of fibers (20B) are generally in a horizontal direction (i.e. generally perpendicular to the direction of the majority of fibers (20A). This is what is referred to as an unbalanced weave. The vertical direction is the TD direction of the reinforced element (15).

Figure 2A:
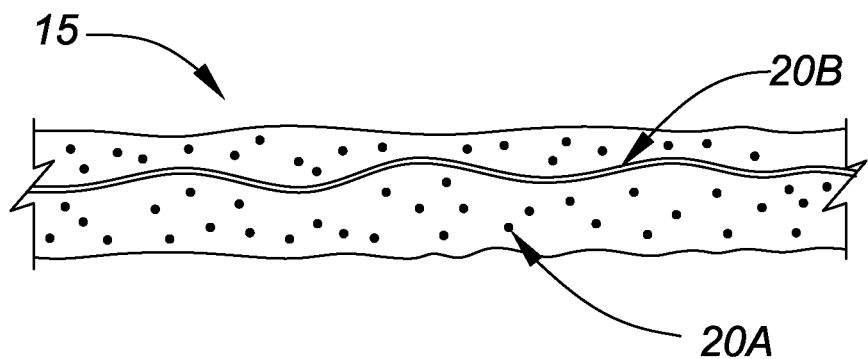
FIGS. 2A and 2B illustrate different cross-sectional views of planar view shown in FIG. 2.
Figure 2B:
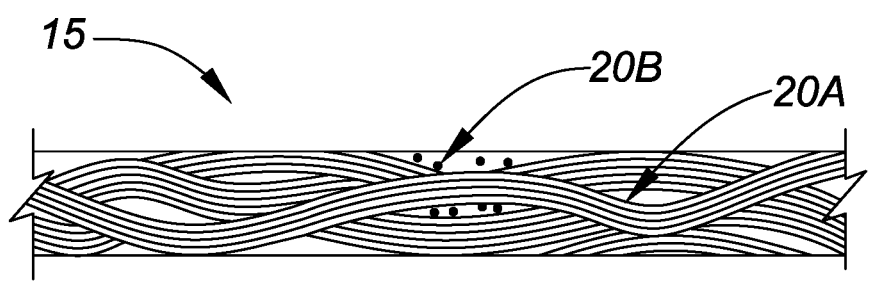

FIGS. 2A and 2B illustrate different cross-sectional views of planar view shown in FIG. 2. In particular, FIG. 2A is the MD cross-section; it provides a view of the TD oriented reinforcing fibers. FIG. 2B is the TD cross-section; it provides a view of the MD oriented reinforcing fibers.

Figure 3:
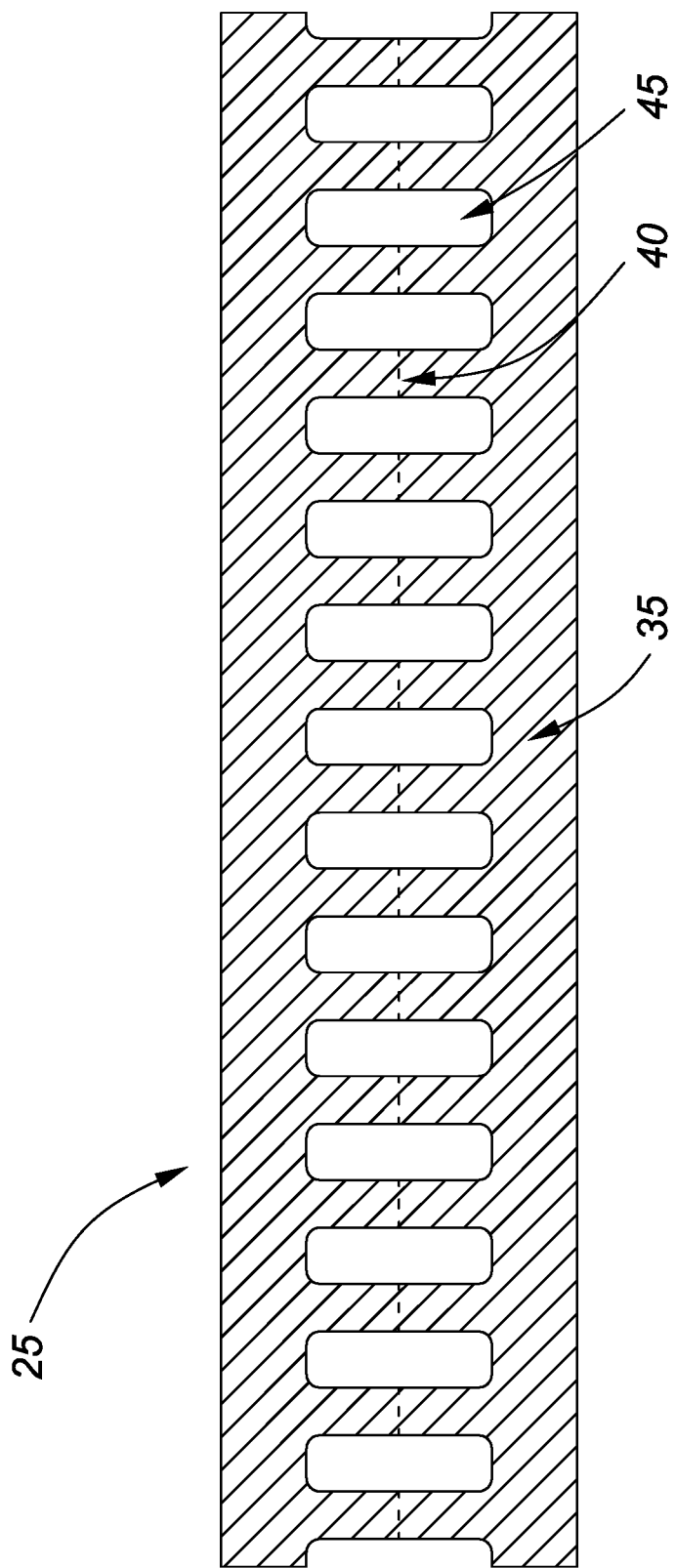
FIG. 3 illustrates another embodiment of the reinforced element for use as a seaming element.

FIG. 3 illustrates another embodiment of the reinforced element for use as a seaming element (25). Here, the reinforced element has been cut to provide apertures (45) and loops (40). In addition, an energy absorbent layer (35) has been added to one surface.

Figure 4:
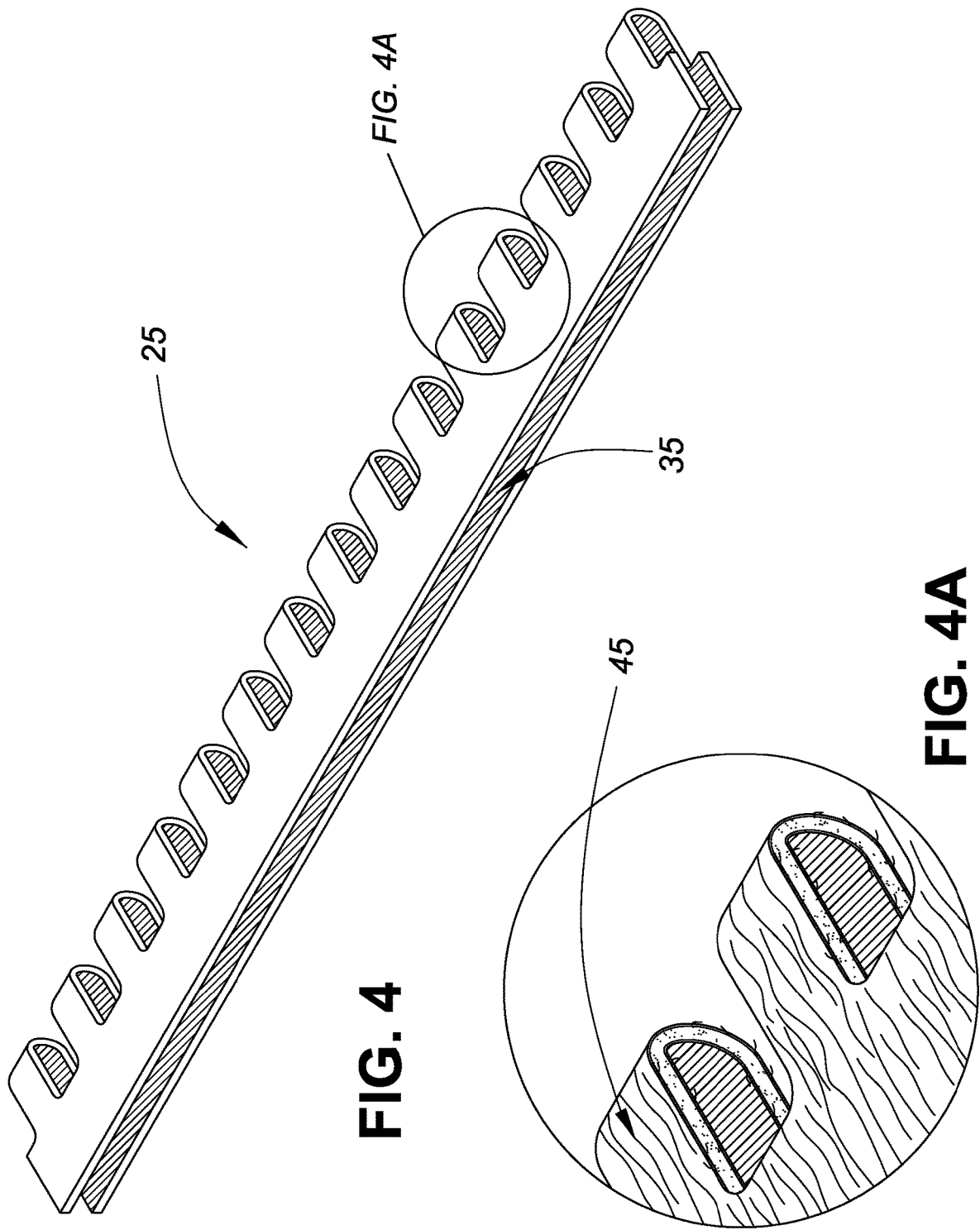
FIG. 4 illustrates a seaming element formed from the embodiment shown in FIG. 3.

FIG. 4 illustrates the seaming element (25) formed from the embodiment shown in FIG. 3. The energy absorbent layer (35) is on the inner surface of the seaming element (25). FIG. 4A illustrates a magnified view of a portion from FIG. 4, in which the reinforcing fibers (45) are shown. For the seam component (25), the TD oriented fibers are in the loop direction.

FIG. 5 illustrates a top planar view of the seaming element (25) shown in FIG. 4. FIG. 5A illustrates a magnified view of a portion from FIG. 5, in which the reinforcing fibers (45) are shown in the loop direction.

FIG. 6 illustrates a cross-sectional view of the seaming element (25) shown in FIG. 5.

Figure 7:
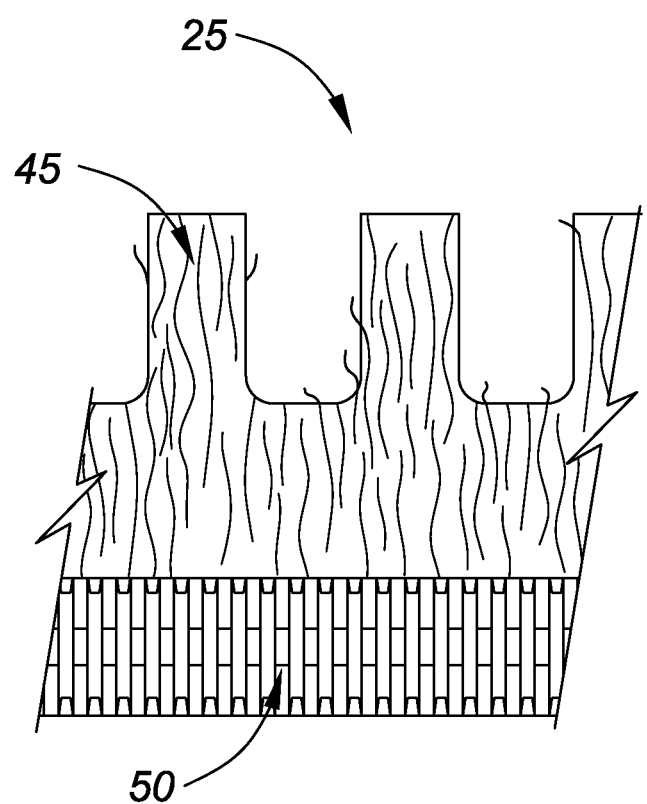
FIG. 7 illustrates a portion of an industrial textile formed by attaching the seaming element shown in FIGS. 4-6 to a woven textile panel.

FIG. 7 illustrates a portion of an industrial textile formed by attaching the seaming element (25) (of FIGS. 4-6) to a woven textile panel (50). The reinforcing fibers (45) are shown in the loop direction.

Figure 8:
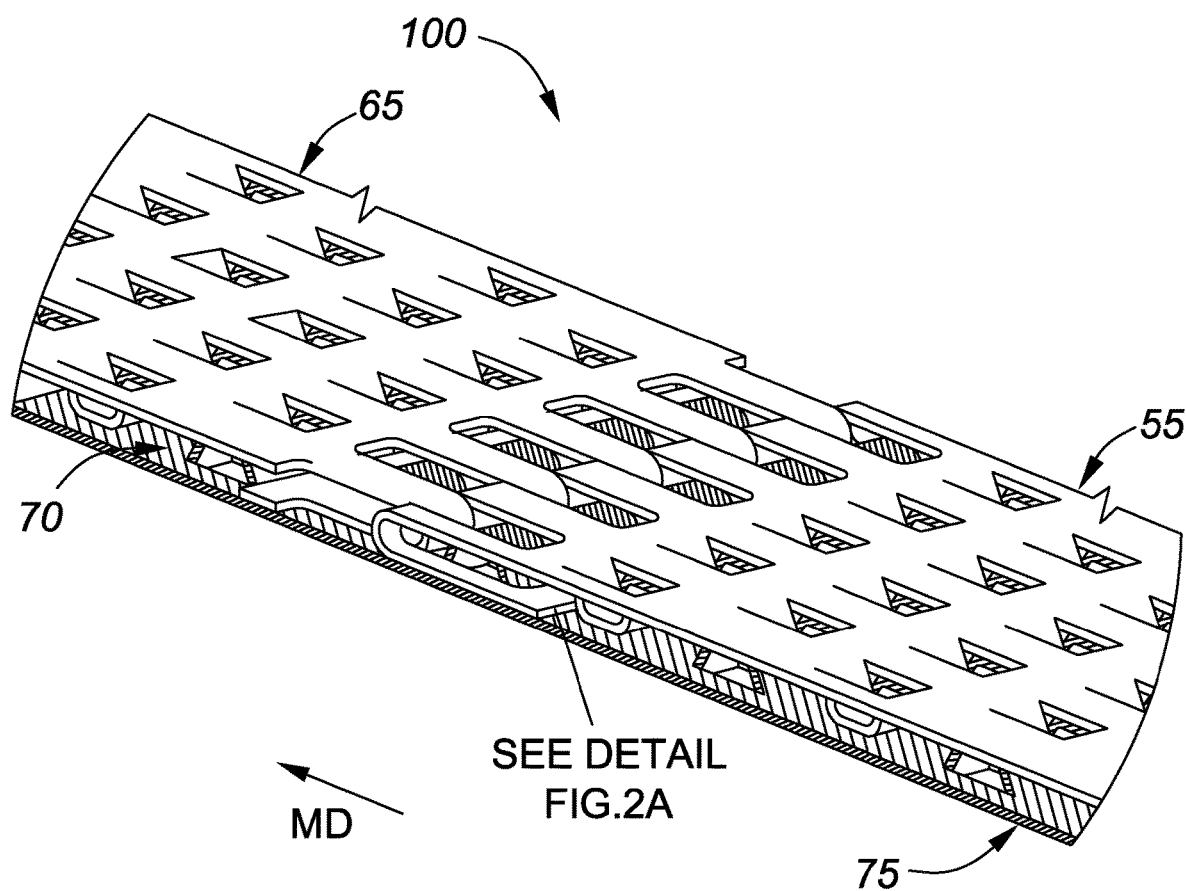
FIG. 8 illustrates an industrial textile formed by the joining of two textile panels; each panel formed from an embodiment of the reinforced element. A detailed cross-sectional view of each panel is shown previously in FIG. 2A.

FIG. 8 illustrates a portion of an industrial textile (100) that is formed by the joining of a plurality of textile panels. In this Figure, a portion where two textile panels (55, 65) join, is shown. Each panel (55, 65) is formed from an embodiment of the reinforced element. Each panel (55, 65) also includes a layer (70) of energy absorbent material. A detailed cross-sectional view of each panel is shown previously in FIG. 2A.

It will be appreciated by persons skilled in the art that the foregoing disclosure constitutes a description of specific embodiments showing how the reinforced element may be applied and put into use. These embodiments are only exemplary and are not meant to limit the disclosure to what has been particularly shown and described herein above. A variety of modifications and variations are possible in light of the above teachings without departing from the scope of the present disclosure. The reinforced element is further described and defined in the claims which now follow.

The invention claimed is:

1. A reinforced element for use in the construction and assembly of an industrial textile, the reinforced element comprising:
   a fibrous reinforcing material encapsulated by a thermoplastic polymer matrix, wherein:
   the thermoplastic polymer matrix comprises an amorphous polyester, a low-crystallinity polyester, polyphenylene sulphide (PPS), or a mixture thereof, wherein the amorphous polyester or the low-crystallinity polyester is hydrolysis stabilized;
   the fibrous reinforcing material comprises continuous filaments selected from the group consisting of thermoplastic polymeric filaments, thermosetting polymeric filaments, glass fibers and a mixture thereof, such that a majority of the continuous filaments are oriented in a first direction and the remainder of the continuous filaments are oriented in a second direction that is generally perpendicular to the first direction;
   wherein a temperature at which the amorphous polymer substantially enters a liquid state, or the melting point of the low-crystallinity polyester, is at least 10° C. less than the melting point of the thermoplastic polymeric filaments;
   wherein the polymer matrix and the fibrous reinforcing material are both substantially transparent to radiant laser energy in a range of from about 800 nm to about 1200 nm; and
   wherein the reinforced element has a tensile strength of between 525 N/cm (300 lbs per inch) and 2000N/cm (1140 lbs per inch).

2. The reinforced element according to claim 1, the reinforced element having an ultimate tensile stress of between 200 MPa and 600 MPa.

3. The reinforced element of claim 1, wherein the fibrous reinforcing material comprises a glass fiber, a liquid crystal polymer (LCP), a high tenacity polyethylene naphthalate (HT-PEN) or PBO (poly[p-phenylene-2,6-benzobisoxazole]).

4. The reinforced element of claim 1, wherein the fibrous reinforcing material comprises a uni-axially oriented semi-crystalline polymer.

5. The reinforced element of claim 1, further comprising an NIR laser energy absorbing material.

6. The reinforced element according to claim 5, wherein the NIR laser energy absorbing material is provided in a layer having an overall thickness that is between 0.05:1 and 0.15:1 of the thickness of the reinforced element.

7. The reinforced element of claim 6, wherein the thickness of the layer containing the NIR laser energy absorbing material is between 5 μm and 75 μm.

8. The reinforced element of claim 5, wherein the NIR laser energy absorbing material is carbon black and is provided in a layer in an amount from about 0.1% w/w to 1.0% w/w based on the total weight of the layer.

9. The reinforced element of claim 1, the reinforced element having a thickness of from 100 μm to 500 μm.

10. A method for manufacturing a reinforced element, the method comprising:
    applying heat and pressure to a planar woven precursor material, wherein:
    the woven precursor material comprises composite yarns; each yarn comprising a first set of continuous monofilament-like fibres comingled with a second set of continuous monofilament-like fibers;
    the first set of fibres forms a thermoplastic polymer matrix comprising an amorphous polyester, a low-crystallinity polyester, polyphenylene sulphide (PPS), or a mixture thereof, wherein the amorphous polyester or the low-crystallinity polyester is hydrolysis stabilized;

the second set of fibres forms a fibrous reinforcing material comprising continuous filaments selected from the group consisting of thermoplastic polymeric filaments, thermosetting polymeric filaments, glass fibers and a mixture thereof, such that a majority of the continuous filaments are oriented in a first direction and the remainder of the continuous filaments are oriented in a second direction that is generally perpendicular to the first direction;

the planar woven precursor consists of an unbalanced weave pattern of the composite yarns;

wherein a temperature at which the amorphous polymer substantially enters a liquid state, or the melting point of the low-crystallinity polyester, is at least 10° C. less than the melting point of the thermoplastic polymeric filaments;

wherein the polymer matrix and the fibrous reinforcing material are both substantially transparent to radiant laser energy in a range of from about 800 nm to about 1200 nm; and wherein the reinforced element has a tensile strength of between 525 N/cm (300 lbs per inch) and 2000N/cm (1140 lbs per inch).

11. The method of claim 10, wherein the planar woven precursor material is passed through a double belt press.

12. The method of claim 10, further comprising addition of one or more layers onto one or both exterior planar surfaces of the reinforced element, wherein the one or more layers comprises an NIR laser energy absorbent material.

13. The method of claim 10, further comprising addition of one or more layers of the thermoplastic polymer matrix onto one or both exterior planar surfaces of the reinforced element.

14. A reinforced element for use in the construction and assembly of an industrial textile, the reinforced element comprising:

a fibrous reinforcing material encapsulated by a thermoplastic polymer matrix, wherein:

the thermoplastic polymer matrix comprises an amorphous polyester, a low-crystallinity polyester, polyphenylene sulphide (PPS), or a mixture thereof;

the fibrous reinforcing material comprises continuous filaments selected from the group consisting of thermoplastic polymeric filaments, thermosetting polymeric filaments, glass fibers and a mixture thereof, such that a majority of the continuous filaments are oriented in a first direction and the remainder of the continuous filaments are oriented in a second direction that is generally perpendicular to the first direction;

wherein a temperature at which the amorphous polymer substantially enters a liquid state, or the melting point of the low-crystallinity polyester, is at least 10° C. less than the melting point of the thermoplastic polymeric filaments;

wherein the polymer matrix and the fibrous reinforcing material are both substantially transparent to radiant laser energy in a range of from about 800 nm to about 1200 nm;

wherein a layer of the thermoplastic polymer matrix on one or both exterior surfaces of the fiber reinforced element; and wherein the reinforced element has a tensile strength of between 525 N/cm (300 lbs per inch) and 2000N/cm (1140 lbs per inch).

15. The reinforced element according to claim 14, the reinforced element having an ultimate tensile stress of between 200 MPa and 600 MPa.

16. The reinforced element of claim 14, wherein the fibrous reinforcing material comprises a glass fiber, a liquid crystal polymer (LCP), a high tenacity polyethylene naphthalate (HT-PEN) or PBO (poly [p-phenylene-2,6-benzobisoxazole]).

17. The reinforced element of claim 14, wherein the fibrous reinforcing material comprises a uni-axially oriented semi-crystalline polymer.

18. The reinforced element of claim 14, further comprising an NIR laser energy absorbing material.

19. The reinforced element according to claim 18, wherein the NIR laser energy absorbing material is provided in a layer having an overall thickness that is between 0.05:1 and 0.15:1 of the thickness of the reinforced element.

20. The reinforced element of claim 19, wherein the thickness of the layer containing the NIR laser energy absorbing material is between 5 μm and 75 μm.

21. The reinforced element of claim 18, wherein the NIR laser energy absorbing material is carbon black and is provided in a layer in an amount from about 0.1% w/w to 1.0% w/w based on the total weight of the layer.

22. The reinforced element of claim 14, the reinforced element having a thickness of from 100 μm to 500 μm.

* * * * *